Patented Feb. 25, 1930

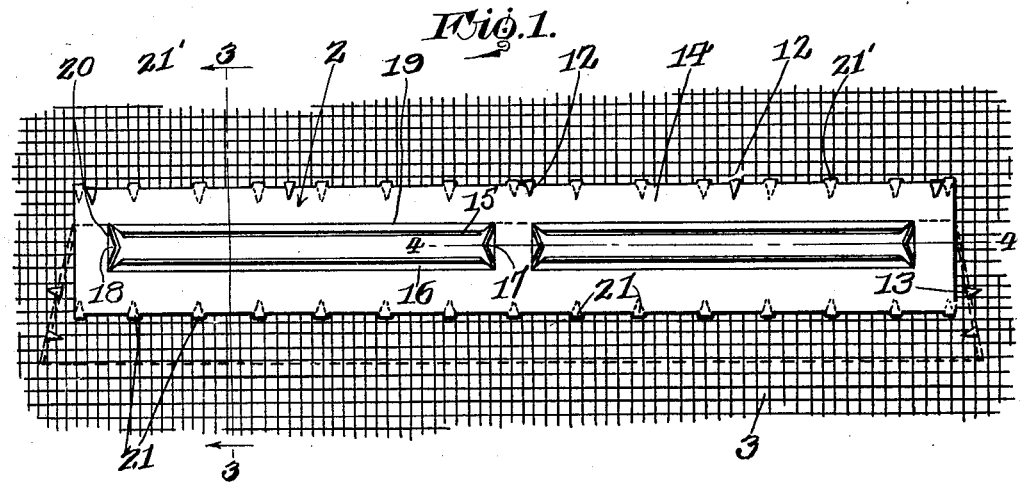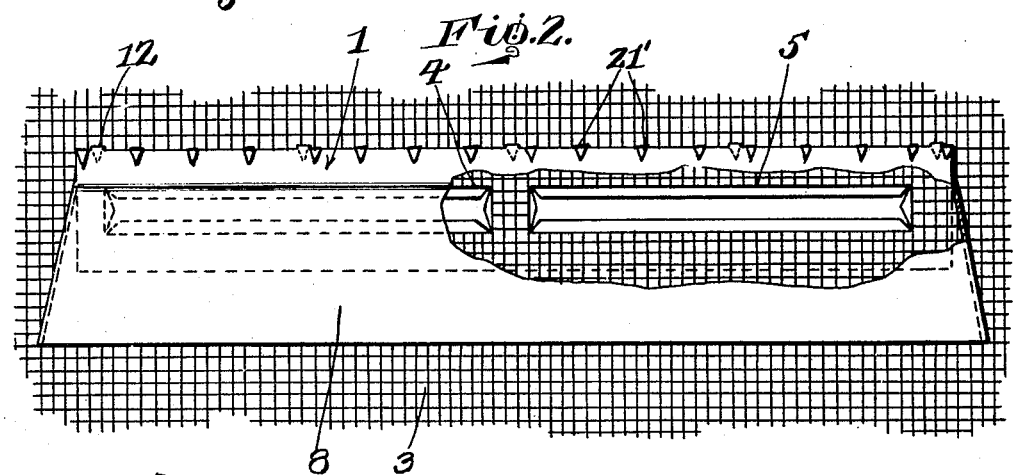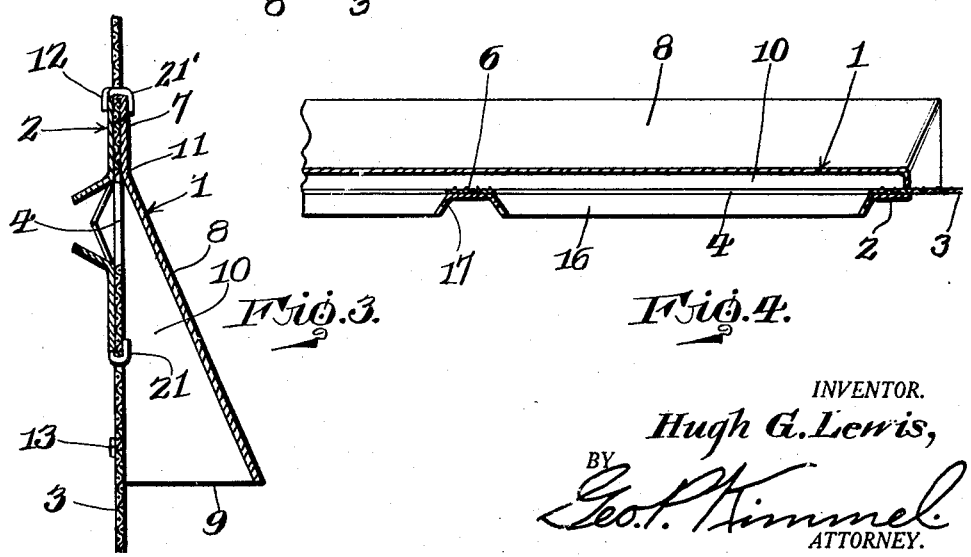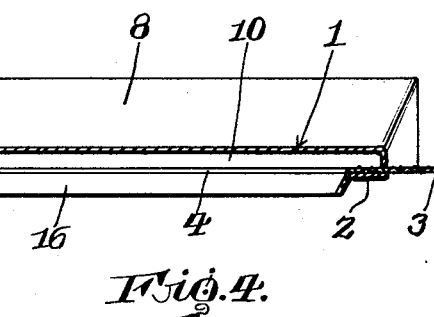

1,748,181

UNITED STATES PATENT OFFICE

HUGH G. LEWIS, OF MONT ALTO, PENNSYLVANIA

FLY-EXIT DEVICE

Application filed April 26, 1929. Serial No. 358,404.

This invention relates to a fly exit attachment for window and door screens, and has for its object to provide, in a manner as hereinafter set forth, an attachment of the class referred to capable of being expeditiously connected to a screen to set up a thoroughly efficient fly exit.

A further object of the invention is to provide, in a manner as hereinafter set forth, a fly exit attachment formed of two sections and having inherent means for connecting them to the screen in fly exit position without the employment of solder.

A further object of the invention is to provide, in a manner as hereinafter set forth, a fly exit attachment for connection to a screen after the latter has been installed in a frame, thereby preventing the screen from being loose or have a tendency to wave, the result being that the screen will remain taut as would not be the case if the opening or openings in the screen were cut prior to the installing of the screen within the frame.

Further objects of the invention are to provide, in a manner as hereinafter set forth, a fly exit attachment which is simple in its construction and arrangement, strong, durable, compact, inexpensive, not marring the appearance of the screen when attached to the latter, quickly installed with respect to the screen, constructed in a manner to overcome the necessity of employing solder for fixedly securing the attachment to the screen, thoroughly efficient in its use, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view of a screen looking toward the outside thereof showing a fly exit attachment, in accordance with this invention, installed with respect to the screen.

Figure 2 is a fragmentary view of a screen looking toward the inside thereof and further illustrating a fly exit attachment secured thereto and with one of the elements of the attachment broken away.

Figure 3 is a section on line 3—3 Figure 1.

Figure 4 is a section on line 4—4 Figure 1.

A fly exit attachment, in accordance with this invention includes an inner and an outer section indicated generally at 1, 2 respectively. The sections are adapted to be connected to opposite faces of the screen 3 which is to be formed with a pair of spaced, rectangular slots 4, 5 disposed in lengthwise arrangement and extending transversely with respect to the screen 3. The edges of the slots or openings 4, 5 have points 6, see Figure 4, formed by the ends of the wires of the screen which are severed to form the slots or openings 4, 5.

Each section of the attachment is formed from a strip of sheet metal of the desired length, width and gauge. The section 1 provides, in connection with the frame 3 a passage forming element. The passage, when section 1 is secured to the screen 3, leads to the openings or slots 4, 5.

The section 1 includes a vertically disposed top part 7, a rearwardly directed, inclined part 8 which is of materially greater length than the part 7 and gradually increases in width from its upper to its lower end. Extending forwardly from each side of the part 8 is a triangular extension 9. As before stated, the section 1 in connection with the screen 3 provides a passage as indicated at 10 in Figure 3, and with the side walls of the latter provided by the extensions 9, the forward wall by the screen 3 and the rear wall by the part 8. The passage 10 is open at its bottom and closed at its top by the point of joinder between parts 7 and 8 as indicated at 11. The part 7 has its top edge formed with integral, upstanding, bendable coupling fingers 12 and each extension 9 has its forward edge provided with spaced, bendable coupling fingers 13. The fingers 12 are employed for coupling sections 1 and 2 to the screen 3 and the fingers 13 are used for coupling the extensions 9 to the screen.

When section 1 is arranged against the inner face of the screen the part 7 abuts against the screen and terminates at its bottom slightly above the top edges of the openings 4, 5. The part 8 projects rearwardly from the screen 3. The fingers 12 are extended through certain of the interstices provided by the screen body and bent around section 2. See Figure 3. The fingers 12 are bent over the top edge of section 2. The fingers 13 extend through certain of the interstices of the screen 3 and are bent against the outer face thereof. See Figure 1.

The section 2 is formed of a rectangular body 14 of a length corresponding to the length of part 7 of section 1. The body 14 is of a width in transverse cross section less than that of section 1. The body 14 is formed with two spaced sets of slits and the material freed by the slits is bent forwardly to provide a pair of exit passages forming continuations of the openings or slots 4, 5. Each exit passage has an upper wall 15, a lower wall 16 and a pair of end walls 17, 18. The walls 15, 16 extend toward each other at an inclination and the end walls 17, 18 also extend towards each other at an inclination. The walls 15, 16 have inclined end edges which are oppositely disposed and the end walls 17, 18 are of triangular contour. The setting up of the walls of each exit passage in the manner as stated provides a passage which gradually decreases in height outwardly. The bends 19, 20 at the points of joinder of the walls with the remaining portion of the body 14 do not align with the points 6, but are arranged adjacent thereto so that the points will project beyond such bends.

The bottom edge of the body 14 is formed with a series of spaced, bendable, coupling fingers 21 adapted to extend through certain of the interstices of the screen 3 and be bent against the inner face of the latter whereby in connection with fingers 12 the section 2 will be secured against the outer face of the screen 3.

The top edge of the body 14 is formed with a series of spaced, bendable, coupling fingers 21' adapted to extend through certain of the interstices of the screen 3, over the top edge 1 and be bent against the rear face of part 7 of section 1 to secure the sections together and to the screen 3.

The section 1 is also what may be termed a directing element, due to the fact that it provides in connection with the screen the passage 10 so that the flies will be directed toward the openings or slots 4, 5 and pass through the same into the exit passages 15.

The construction of the attachment enables it to be expeditiously secured to the screen, after the openings or slots 4, 5 are placed therein. The attachment is connected with the screen without the employment of solder and all that is necessary to do is to arrange the sections in the desired position and then bend the coupling fingers in the manner as illustrated and which fixedly secures the attachment against the outer and inner faces of the screen 3.

Although the attachment is illustrated, by way of example, in connection with a screen, with the section 1 positioned against the inner face thereof and the section 2 against the other face, yet it is to be understood that the sections can be reversed in order to adapt the attachment to be used in connection with a fly trap.

It is thought the many advantages of a fly exit attachment, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. A fly exit attachment for screens comprising a pair of upstanding sections for positioning against opposite faces of a screen formed with a slot, one of said sections having means to provide an upwardly directed passage leading to the slot, the other of said sections having outwardly directed means to provide an exit passage leading from the slot, and said sections having inherent means extending from certain of the edges thereof and adapted to extend through the screen for securing the sections directly thereto and for connecting said sections together.

2. A fly exit attachment for screens comprising a pair of upstanding sections for positioning against opposite faces of a screen formed with a slot, one of said sections having means to provide an upwardly directed passage leading to the slot, the other of said sections having outwardly directed means to provide an exit passage leading from the slot, one of said sections having its top and sides provided with bendable coupling fingers for extension through the screen for connecting it and the other of the sections to the screen and for connecting said sections together, and said other section having bendable coupling fingers at its bottom for connecting it to the screen.

3. An attachment of the class referred to comprising a pair of passage forming elements for positioning against opposite face of a slotted body, the passage formed by one of said elements leading to the slot in said body, the passage formed by the other of said elements leading from the slot in said body, and said elements having inherent means for coupling them together and for securing them to said body.

4. A fly exit attachment for screens comprising a pair of upstanding sections for positioning against opposite faces of a screen formed with a slot, one of said sections having means to provide an upwardly directed passage leading to the slot, the other of said sections having outwardly directed means to provide an exit passage leading from the slot, said means of that section providing the upwardly directed passage including spaced, forwardly projecting extensions, and bendable coupling fingers at the top of one section, at the forward edges of said extensions and at the bottom of the other section and adapted to engage with the screen for securing the sections thereto.

5. A fly exit attachment for screens comprising a pair of upstanding sections for positioning against opposite faces of a screen formed with a slot, one of said sections having means to provide an upwardly directed passage leading to the slot, the other of said sections having outwardly directed means to provide an exit passage leading from the slot, said means of that section providing the upwardly directed passage including a rearwardly directed, inclined part having forwardly projecting extensions, and bendable coupling fingers at the top of one section, at the forward edges of said extensions and at the bottom of the other section and adapted to engage with the screen for securing the sections thereto.

6. A fly exit attachment for screens comprising a pair of upstanding sections for positioning against opposite faces of a screen formed with a pair of spaced slots, one of said sections having means to provide an upwardly directed passage common to and leading to said slots, the other of said sections having outwardly directed means to provide a pair of spaced exit passages each leading from one of said slots, and each of said sections having spaced, bendable coupling fingers extended therefrom for extension through the screen to secure the sections thereto and for securing the sections together.

7. In a fly exit attachment for screens, a flat rectangular body formed with two spaced sets of slits, the material freed by sets of slits being extended forwardly to provide a pair of spaced exit passages adapted to lead from a pair of spaced exit slots formed in the screen, and said flat body having inherent means at the top and bottom edges for connecting it directly against one face of the screen to align said passages with said slots.

8. In a fly exit attachment for screens, a flat body having a set of slits, the material freed by the slits being extended forwardly to provide an exit passage adapted to lead from an exit slot formed in the screen, and said flat body having inherent means for connecting it directly against one face of the screen to align said passage with said slot.

9. In a fly exit adapted for screens, an exit passage forming element adapted to enclose a fly exit means formed in the screen, said element including a vertically disposed top part for positioning against one face of the screen above said means, a rearwardly directed, inclined part projecting from the lower portion of said top part, a triangular extension at each end of said inclined part, projecting forwardly from the latter and abutting the screen, and said top part and extensions having inherent means for coupling the element directly against the screen.

10. In a fly exit for screens, an exit passage forming element adapted to enclose a fly exit means formed in the screen and including a vertically disposed part positioned directly against one face of the screen, a rearwardly directed, inclined part projecting from the lower portion of the top part, a triangular extension at each end of said inclined part, projecting forwardly from the latter and abutting the screen, means on said top part and extensions for coupling the element against the screen, combined with a flat body having sets of slits, the material freed by the slits being extended forwardly to provide an exit passage adapted to lead from the exit means in the screen, said flat body of less height than the height of said element, and means carried by said flat body for connecting it against that face of the screen opposite the face to which said element is connected.

In testimony whereof, I affix my signature hereto.

HUGH G. LEWIS.